11,318,689 B2

(12) United States Patent
Prause et al.

(10) Patent No.: US 11,318,689 B2
(45) Date of Patent: May 3, 2022

(54) PLY TRANSPORTING AND COMPACTING APPARATUS AND METHOD THEREFOR

(71) Applicant: The Boeing Company, Chicago, IL (US)

(72) Inventors: Richard A. Prause, Charleston, SC (US); Allen J. Halbritter, Charleston, SC (US); Andrew E. Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 525 days.

(21) Appl. No.: 16/229,024

(22) Filed: Dec. 21, 2018

(65) Prior Publication Data
US 2020/0198265 A1 Jun. 25, 2020

(51) Int. Cl.
*B29C 70/54* (2006.01)
*B29C 43/36* (2006.01)
*B29C 70/34* (2006.01)
*B29C 70/44* (2006.01)

(52) U.S. Cl.
CPC ........ *B29C 70/541* (2013.01); *B29C 43/3642* (2013.01); *B29C 70/342* (2013.01); *B29C 70/44* (2013.01); *B29C 2043/3644* (2013.01)

(58) Field of Classification Search
CPC ... B29C 43/3642; B29C 70/44; B29C 70/541; B29C 31/08; B29C 70/38; B29C 70/342; B29C 2043/3644
See application file for complete search history.

(56) References Cited

U.S. PATENT DOCUMENTS

| | | | |
|---|---|---|---|
| 3,648,865 A * | 3/1972 | Meyers | B66C 1/0281 414/801 |
| 3,983,282 A | 9/1976 | Seemann, III | |
| 4,016,022 A | 4/1977 | Browning et al. | |
| 4,120,632 A | 10/1978 | Stoeberl | |
| 4,132,755 A | 1/1979 | Johnson | |
| 4,180,608 A | 12/1979 | Del | |
| 4,511,386 A * | 4/1985 | Kellar | C03B 35/145 294/188 |
| 4,622,091 A | 11/1986 | Letterman | |

(Continued)

FOREIGN PATENT DOCUMENTS

EP 3 406 430 11/2018
WO WO 2016/005322 1/2016

OTHER PUBLICATIONS

European Patent Office, Extended European Search Report, App. No. 19200603.9 (dated Apr. 22, 2020).

*Primary Examiner* — Monica A Huson
(74) *Attorney, Agent, or Firm* — Walters & Wasylyna LLC

(57) ABSTRACT

A ply transporting and compacting apparatus comprises a rigid frame, a top-layer sheet of flexible rubber material fastened to the frame, and a bottom-layer sheet of perforated flexible rubber material having openings. The apparatus also comprises a middle-layer sheet of flow media material disposed in a first plenum area that is defined between the top and bottom layer sheets. The apparatus further comprises a moving device coupled to the frame and arranged to lower the frame and sheets onto a composite ply at a trimming location to pick up the composite ply with a suction force when a vacuum is drawn in the first plenum area to create the suction force through the openings of the bottom-layer sheet.

20 Claims, 11 Drawing Sheets

(56) References Cited

U.S. PATENT DOCUMENTS

| | | |
|---|---|---|
| 4,726,924 A | 2/1988 | Mittelstadt |
| 4,902,215 A | 2/1990 | Seemann, III |
| 4,942,013 A | 7/1990 | Palmer et al. |
| 5,052,906 A | 10/1991 | Seemann |
| 5,116,216 A | 5/1992 | Cochran et al. |
| 5,123,985 A | 6/1992 | Evans et al. |
| 5,129,813 A | 7/1992 | Shepherd |
| 5,316,462 A | 5/1994 | Seemann |
| 5,364,584 A | 11/1994 | Imanara et al. |
| 5,427,725 A | 6/1995 | White et al. |
| 5,439,635 A | 8/1995 | Seemann |
| 5,441,692 A | 8/1995 | Taricco |
| 5,576,030 A | 11/1996 | Hooper |
| 5,601,852 A | 2/1997 | Seemann |
| 5,702,663 A | 12/1997 | Seemann |
| 5,721,034 A | 2/1998 | Seemann, III et al. |
| 5,904,972 A | 5/1999 | Tunis, III et al. |
| 5,939,013 A | 8/1999 | Han et al. |
| 5,958,325 A | 9/1999 | Seemann, III et al. |
| 6,090,335 A | 7/2000 | McClure et al. |
| 6,299,819 B1 | 10/2001 | Han |
| 6,391,436 B1 | 5/2002 | Xu et al. |
| 6,406,659 B1 | 6/2002 | Lang et al. |
| 7,186,361 B2 | 3/2007 | Kasai et al. |
| 7,469,735 B2 | 12/2008 | Brown et al. |
| 7,544,261 B1 | 6/2009 | Nogueroles Vines et al. |
| 7,603,017 B2 | 10/2009 | Cianciotto et al. |
| 7,670,525 B2 | 3/2010 | Weidmann et al. |
| 7,871,553 B2 | 1/2011 | Wilkerson et al. |
| 7,975,549 B2 | 7/2011 | Fetzer et al. |
| 7,993,480 B2 | 8/2011 | Anderson et al. |
| 8,066,929 B2 | 11/2011 | Eberth et al. |
| 8,551,380 B2 | 10/2013 | Hawkins et al. |
| 9,387,657 B2 | 7/2016 | Smith, Jr. et al. |
| 9,701,067 B2 | 7/2017 | Hawkins et al. |
| 2006/0059848 A1 | 3/2006 | Macdonald-Schmidt et al. |
| 2006/0216480 A1 | 9/2006 | Weidmann et al. |
| 2006/0249868 A1 | 11/2006 | Brown et al. |
| 2007/0161483 A1 | 7/2007 | Raf |
| 2007/0175575 A1 | 8/2007 | Rubin et al. |
| 2008/0053599 A1 | 3/2008 | Aijima |
| 2009/0008825 A1 | 1/2009 | Eberth et al. |
| 2009/0148647 A1 | 6/2009 | Jones et al. |
| 2009/0239018 A1 | 9/2009 | Aijima |
| 2009/0261199 A1 | 10/2009 | McCarville et al. |
| 2009/0263618 A1 | 10/2009 | McCarville et al. |
| 2010/0080942 A1 | 4/2010 | McCarville et al. |
| 2011/0097554 A1 | 4/2011 | Kehrl et al. |
| 2011/0192541 A1 | 8/2011 | Anderson et al. |

\* cited by examiner

PLY TRANSPORTING AND COMPACTING APPARATUS AND METHOD THEREFOR

FIELD

The present application relates to composite structures and, more particularly, to a ply transporting and compacting apparatus and method therefor.

BACKGROUND

A composite structure is usually formed using a cutting machine and a forming tool. The cutting machine cuts one or more pieces of composite ply material, and the cut pieces are then transported from the cutting machine and placed on the forming tool. The cut pieces are then consolidated on the forming tool to form the composite structure. The known ways of transporting cut pieces to a forming tool, placing the cut pieces on the forming tool, and then consolidating the cut pieces are labor-intensive and time-consuming. It would be desirable to overcome drawbacks of known ways of transporting, placing, and consolidating one or more cut pieces of composite ply material on a forming tool to form a composite structure.

SUMMARY

In one aspect, a ply transporting and compacting apparatus comprises a rigid frame, a top-layer sheet of flexible rubber material fastened to the frame, and a bottom-layer sheet of perforated flexible rubber material having openings. The apparatus also comprises a middle-layer sheet of flow media material disposed in a first plenum area that is defined between the top and bottom layer sheets. The apparatus further comprises a moving device coupled to the frame and arranged to lower the frame and sheets onto a composite ply at a trimming location to pick up the composite ply with a suction force when a vacuum is drawn in the first plenum area to create the suction force through the openings of the bottom-layer sheet.

In another aspect, a method is provided for forming a composite structure with a desired shape. The method comprises picking up a composite ply at a first location by using a suction force from a first vacuum-tight chamber, and transporting the composite ply from the first location to a second location. The method also comprises placing the composite ply on a forming tool at the second location, and forming a second vacuum-tight chamber when the composite ply is placed on the forming tool at the second location. The method further comprises drawing a vacuum in the second vacuum-tight chamber to provide a vacuum bag structure in which the composite ply can consolidate.

In yet another aspect, a system is provided for enabling a composite ply to be picked at a trimming location, placed at a forming location, and then vacuum bagged at the forming location. The system comprises a frame and a first plenum area supported by the frame. The system also comprises a controller arranged to control (i) picking of the composite ply based upon sensed ply position information, (ii) placing of the composite ply based upon sensed ply position information, and (iii) vacuum bagging of the composite ply based upon sensed vacuum pressure information in a second plenum area that includes the first plenum area.

Other aspects will become apparent from the following detailed description, the accompanying drawings and the appended claims.

DETAILED DESCRIPTION

The present application is directed to a ply transporting and compacting apparatus and method therefor. The specific construction of the ply transporting and compacting apparatus and method therefor and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a ply transporting and compacting apparatus and method for forming a composite structure for an airplane part. The ply transporting and compacting apparatus and method may be implemented by an original equipment manufacturer (OEM) in compliance with military and space regulations. It is conceivable that the disclosed ply transporting and compacting apparatus and method may be implemented in many other composite manufacturing industries.

Figure 1:
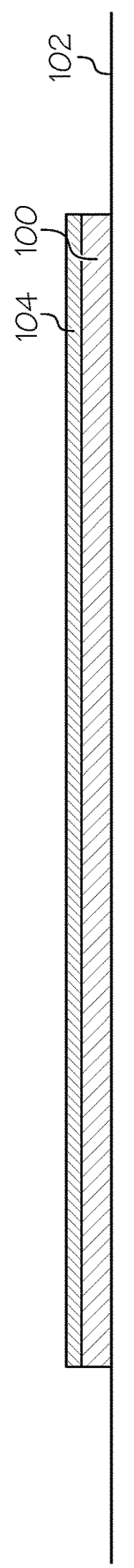
FIG. 1 is an elevational view, in section, of an example cut piece of a composite ply in a starting state.

Referring to FIG. 1, a cross-sectional view of an example cut piece of a composite ply 100 in a starting state is illustrated. The composite ply 100 is shown resting on a bed/table 102 of a cutting location. A perforated barrier film 104 is disposed on top of the composite ply 100. For example, the composite ply 100 may be sourced or manufactured with the perforated barrier film 104 already connected to the composite ply 100. The composite ply 100 may comprise carbon-fiber material pre-impregnated with epoxy. The composite ply 100 may comprise a net-trimmed composite ply, and the cutting location may comprise a trimming location.

Figure 2:
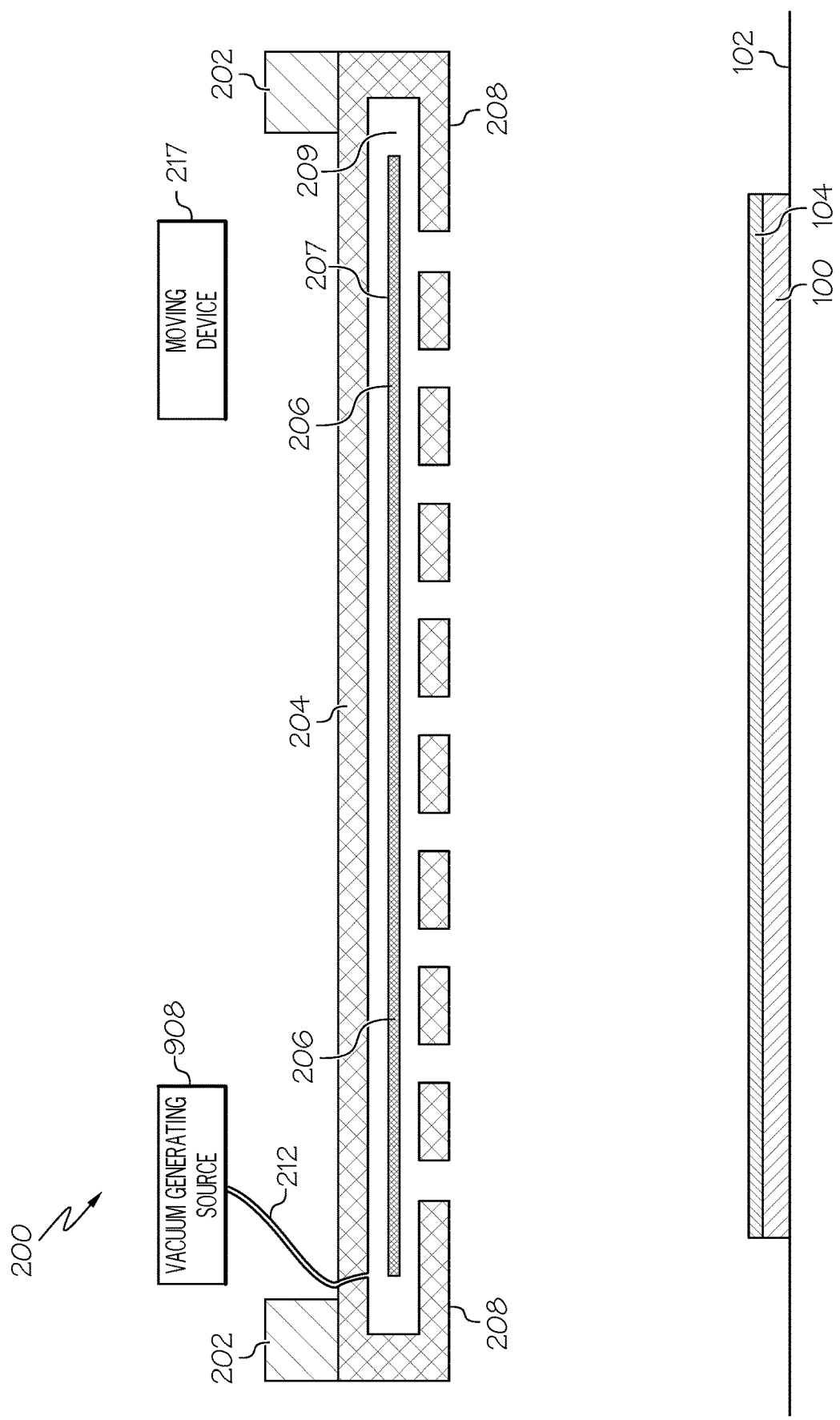
FIG. 2 is an elevational view, in section, of a ply transporting and compacting apparatus over the composite ply of FIG. 1, and constructed in accordance with an embodiment.

Referring to FIG. 2, a cross-sectional view of a ply transporting and compacting apparatus 200 over the composite ply of FIG. 1, and constructed in accordance with an embodiment is illustrated. The apparatus 200 includes a rigid frame 202 to which a top-layer sheet 204 is fastened. The apparatus also includes a middle-layer sheet 206 that is sandwiched between the top-layer sheet 204 and a bottom-layer sheet 208. The top-layer sheet 204 comprises a solid flexible rubber, the middle-layer sheet 206 comprises flow media 207, and the bottom-layer sheet 208 comprises perforated flexible rubber having openings 210. The solid flexible rubber material and the perforated flexible rubber material may comprise silicone rubber, for example.

The top-layer sheet 204 and the bottom-layer sheet 208 are coupled together in a manner to provide a first plenum area 209 (i.e., a manifold) in which the flow media 207 of the middle-layer sheet 206 is disposed. The first plenum area 209 is supported by the frame 202. The flow media 207 of the middle-layer sheet 206 is capable of transferring a vacuum pressure from the flow media 207 to the openings 210 in the perforated flexible rubber of the bottom-layer sheet 208 when a vacuum in a vacuum line 212 (which is fluidly coupled with a portable vacuum generating source 908) is drawn on the flow media 207. For example, the flow media 207 comprises a permeable material, such as bi-planer mesh or non-woven fabric, for examples. Other types of flow media 207 are possible.

Figure 3:
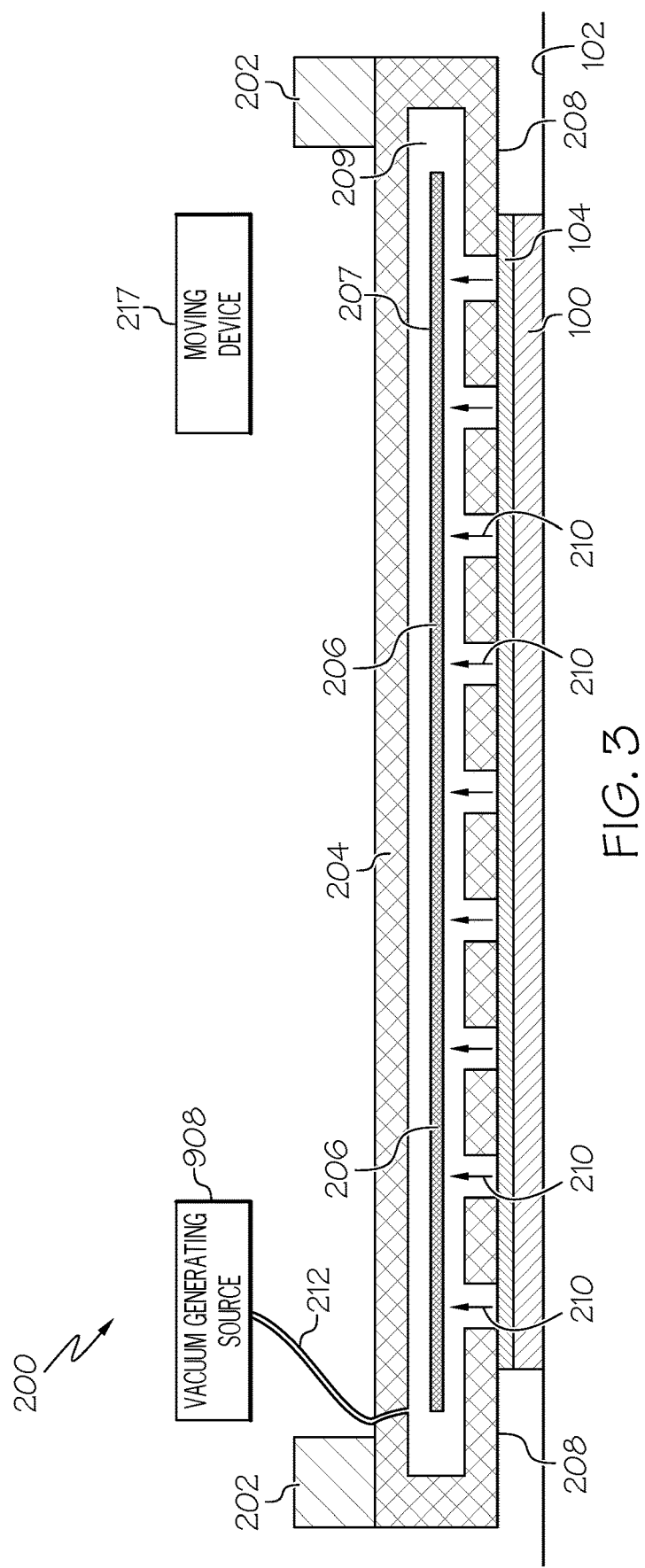
FIG. 3 is an elevational view, in section, showing the ply transporting and compacting apparatus of FIG. 2 lowered onto the composite ply of FIG. 1.

Referring to FIG. 3, a cross-sectional view showing the ply transporting and compacting apparatus 200 of FIG. 2 lowered onto the composite ply 100 is illustrated. More specifically, the bottom-layer sheet 208 is in engagement with composite ply 100 through the barrier film 104 that is disposed on the composite ply 100. The barrier film 104 acts as an intermediate layer between the composite ply 100 and the bottom-layer sheet 208. When a vacuum from vacuum line 212 is drawn on the flow media 207 in the first plenum area 209 between the top-layer sheet 204 and the bottom-layer sheet 208, the flow media 207 allows the vacuum to be transferred through the openings 210 in the perforated bottom-layer sheet 208 to the composite ply 100. This allows the composite ply 100 to be picked up by the suction force created by the vacuum. The barrier film 104, which is releasably coupled with the composite ply 100, is perforated to allow vacuum to transfer from the bottom-layer sheet 208 to the composite ply 100. The barrier film 104 also acts as a barrier between the bottom-layer sheet 208 and the composite ply 100 so that tacky resin on the composite ply 100 does not stick to the bottom-layer sheet 208.

Figure 4:
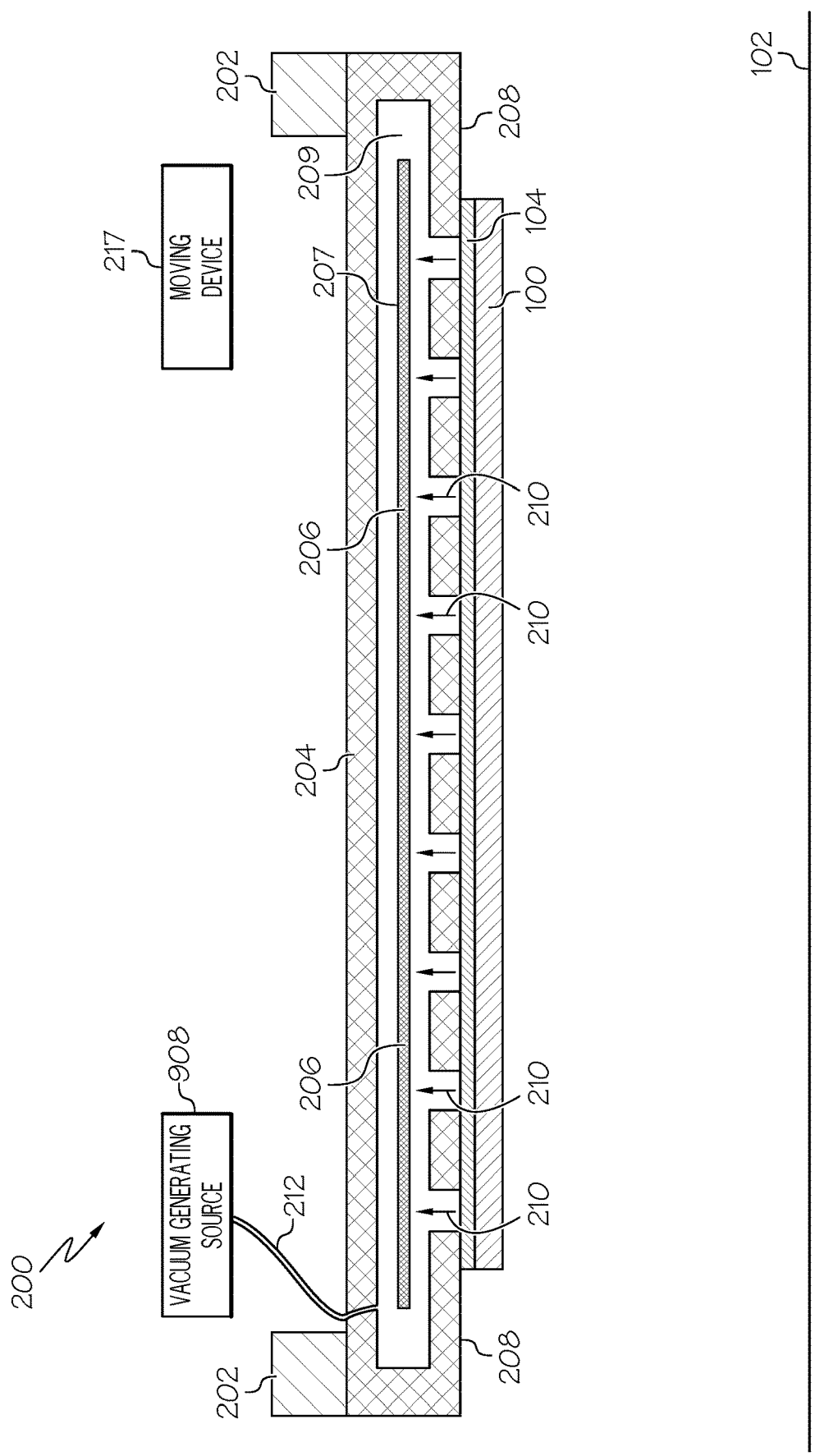
FIG. 4 is an elevational view, in section, showing the ply transporting and compacting apparatus of FIG. 3 picking up the composite ply.

Referring to FIG. 4, a cross-sectional view showing the ply transporting and compacting apparatus 200 of FIG. 3 picking up the composite ply 100 (and the barrier film 104 that is attached to the composite ply 100) is illustrated. The ply transporting and compacting apparatus 200 is controlled by a moving device 217 to be raised away from the bed/table 102 as the suction force acts on top of the composite ply 100 to maintain the composite ply 100 against the bottom-layer sheet 208 and thereby to pick up the composite ply 100. In other words, the barrier film 104 and attached composite ply 100 act to seal the openings 210 in the bottom-layer sheet 208 of the apparatus 200, thereby creating a vacuum-drawn connection between the apparatus 200 and the composite ply 100. The moving device 217 is conventional and, therefore, will not be described.

Figure 5:
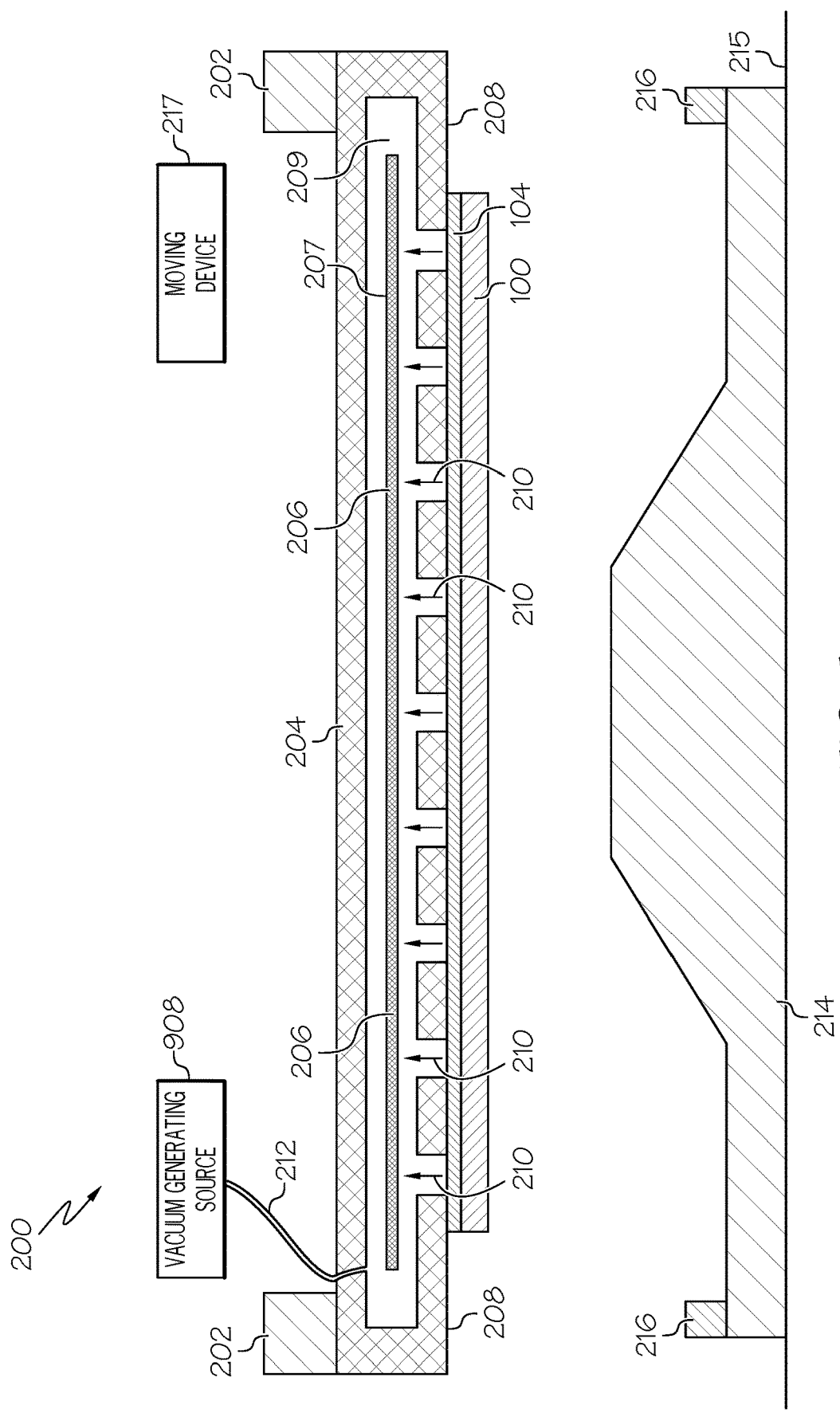
FIG. 5 is an elevational view, in section, showing the ply transporting and compacting apparatus of FIG. 4 with the composite ply moved over a forming tool.

Referring to FIG. 5, a cross-sectional view showing the ply transporting and compacting apparatus 200 of FIG. 4 with the composite ply 100 moved over a forming tool 214 is illustrated. The forming tool 214 is shown resting on a bed/table 215 at a forming location which is away from the cutting location where the composite ply 100 was picked up. A lip seal 216 is disposed on outer perimeter of the forming tool 214. In FIG. 5, the ply transporting and compacting apparatus 200 is in a position ready to be lowered onto the forming tool 214.

Figure 6:
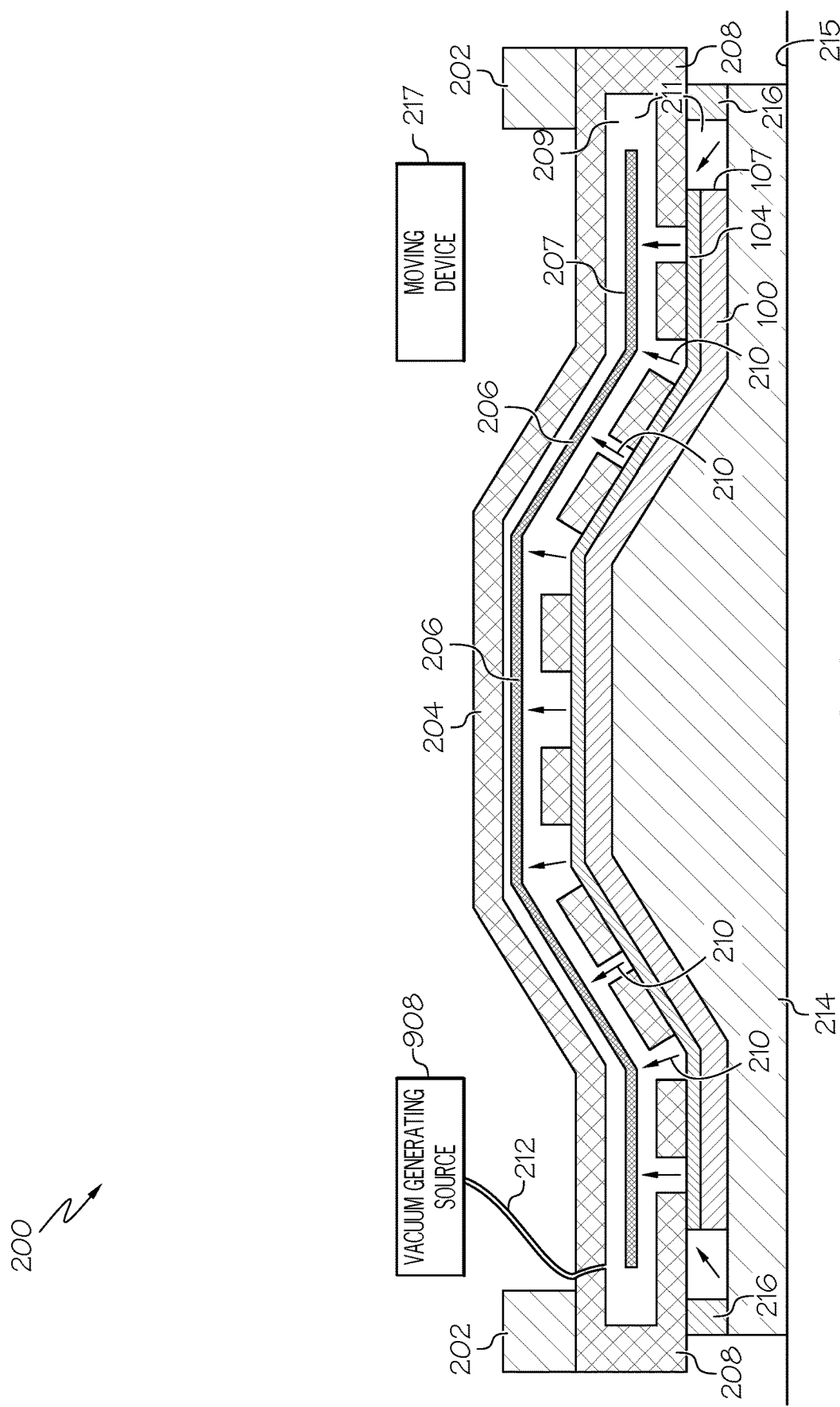
FIG. 6 is an elevational view, in section, showing the ply transporting and compacting apparatus of FIG. 5 with the composite ply lowered onto the forming tool of FIG. 5 to form a composite structure.

Referring to FIG. 6, a cross-sectional view showing the ply transporting and compacting apparatus 200 of FIG. 5 with the composite ply 100 lowered by the moving device 217 onto the forming tool 214 is illustrated. The composite ply 100 is draped onto the forming tool 214 or any previously draped plies on the forming tool 214 to create a second plenum area 211 that is larger than the first plenum area 209 and includes the first plenum area 209. The second plenum area 211 includes the first plenum area 209 and is defined in part between an edge 107 of the composite ply 100 and the lip seal 216 on the forming tool 214.

As the apparatus 200 is being lowered from the position shown in FIG. 5 to the position shown in FIG. 6, the top-layer sheet 204, the middle-layer sheet 206, and the bottom-layer sheet 208 flex and bend to conform to the shape of the forming tool 214. When this occurs, the composite ply 100 is compacted between the forming tool 214 and the bottom-layer sheet 208. The compacted composite ply 100 also flexes and bends to conform to the shape of the forming tool 214. The barrier film 104 provides the bottom-layer sheet 208 with some ability to slip over the composite ply 100 as the bottom-layer sheet 208 stretches so that the composite ply 100 does not overstretch as the apparatus 200 is being lowered onto the forming tool 214.

The above-described process of picking up the composite ply 100 at the cutting location, transporting it to the forming location, and then lowering it onto the forming tool 214 is repeated for any additional number of composite plies that may be desired. This forms a composite ply layup (i.e., one or more composite plies) on the forming tool 214. After the apparatus 200 places the last composite ply onto the forming tool 214 and the composite ply layup contains the desired number of composite plies, the apparatus 200 remains in the lowered position, as shown in FIG. 6. Any conventional ply layup device may be used to create one or more plies. The ply layup device could layup unidirectional tapes or tows in an adjacent and contiguous arrangement. Each ply may have a different orientation of the fibers. Each ply could be net-trimmed prior to being laid up.

When the apparatus 200 is in the position shown in FIG. 6, a vacuum via vacuum line 212 is drawn on the flow media 207 of the middle-layer sheet 206. As mentioned, the flow media 207 allows the vacuum to be transferred through the openings 210 in the perforated bottom-layer sheet 208 to the composite ply 100 that is on the forming tool 214. The lip seal 216 provides a vacuum-tight seal between the forming tool 214 and the bottom-layer sheet 208. The material of the forming tool 214 is impermeable. Thus, the composite ply 100 shown in FIG. 6 is in a vacuum-tight enclosure of the second plenum area 211 (i.e., a "vacuum bag structure") defined by the apparatus 200, the forming tool 214 and the lip seal 216.

The composite ply 100 shown in FIG. 6 is in its desired shape corresponding to the shape of the forming tool 214 (or the shape of any previously draped plies on the forming tool 214). The composite ply 100 may be allowed to remain in the position of FIG. 6 for as long as desired to allow the composite ply 100 to be more compacted by the vacuum in the vacuum bag environment.

Figure 7:
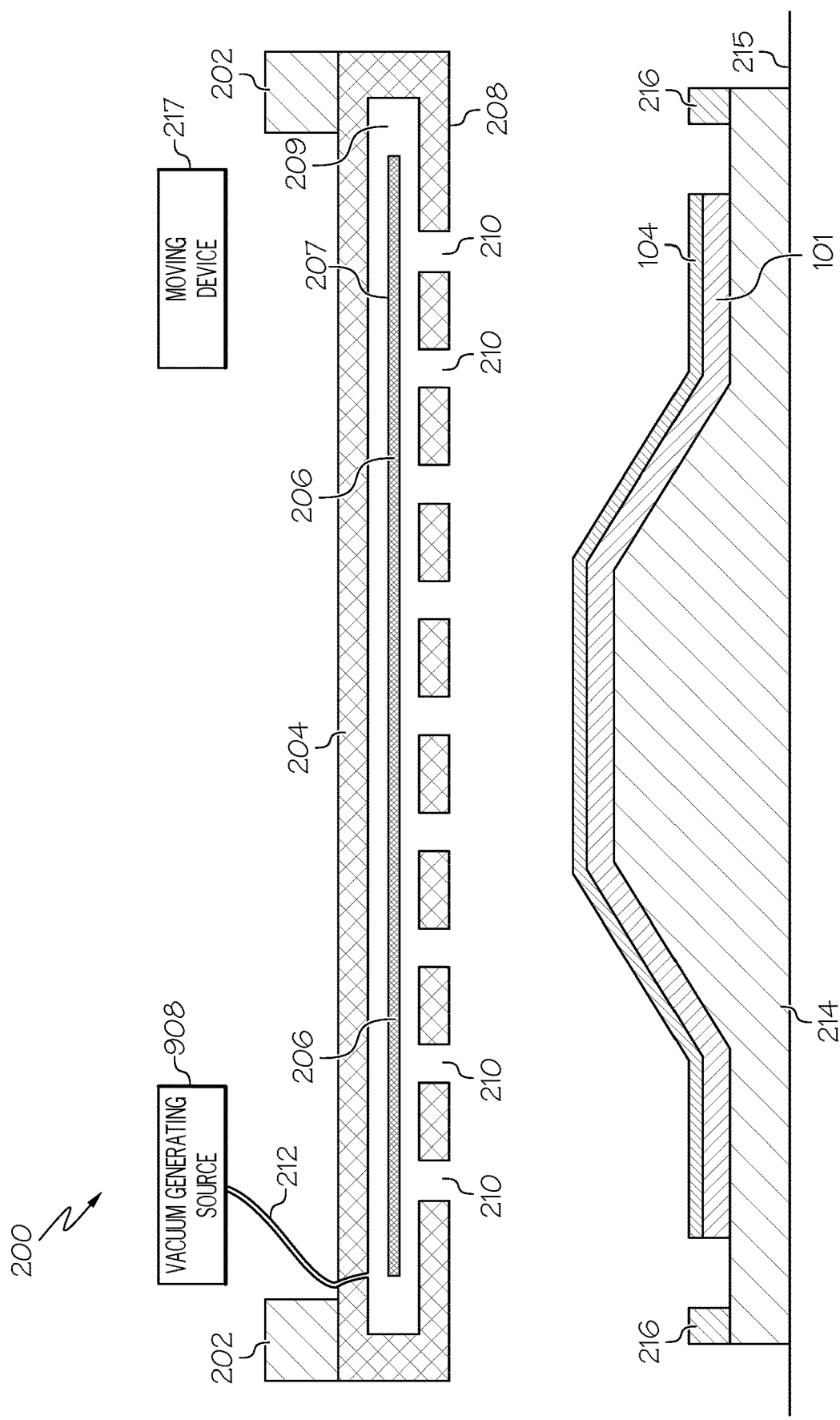
FIG. 7 is an elevational view, in section, showing the ply transporting and compacting apparatus of FIG. 6 raised away from the formed composite structure on the forming tool.

Referring to FIG. 7, a cross-sectional view shows the apparatus 200 raised away from the consolidated composite ply 101 that has been placed on the forming tool 214. The consolidated composite ply 101 shown in FIG. 7 is designated with reference numeral "101" to distinguish it over the composite ply 100 shown in FIGS. 1-6. When the apparatus 200 is raised away from the position shown in FIG. 6 to the position shown in FIG. 7, the vacuum in the vacuum bag structure is released and the consolidated composite ply 101 can be subjected to further processing (e.g., curing) or one or more additional composite plies 100 may be laid up on the consolidated composite ply 101 to form a layup of consolidated composite plies.

Figure 8:
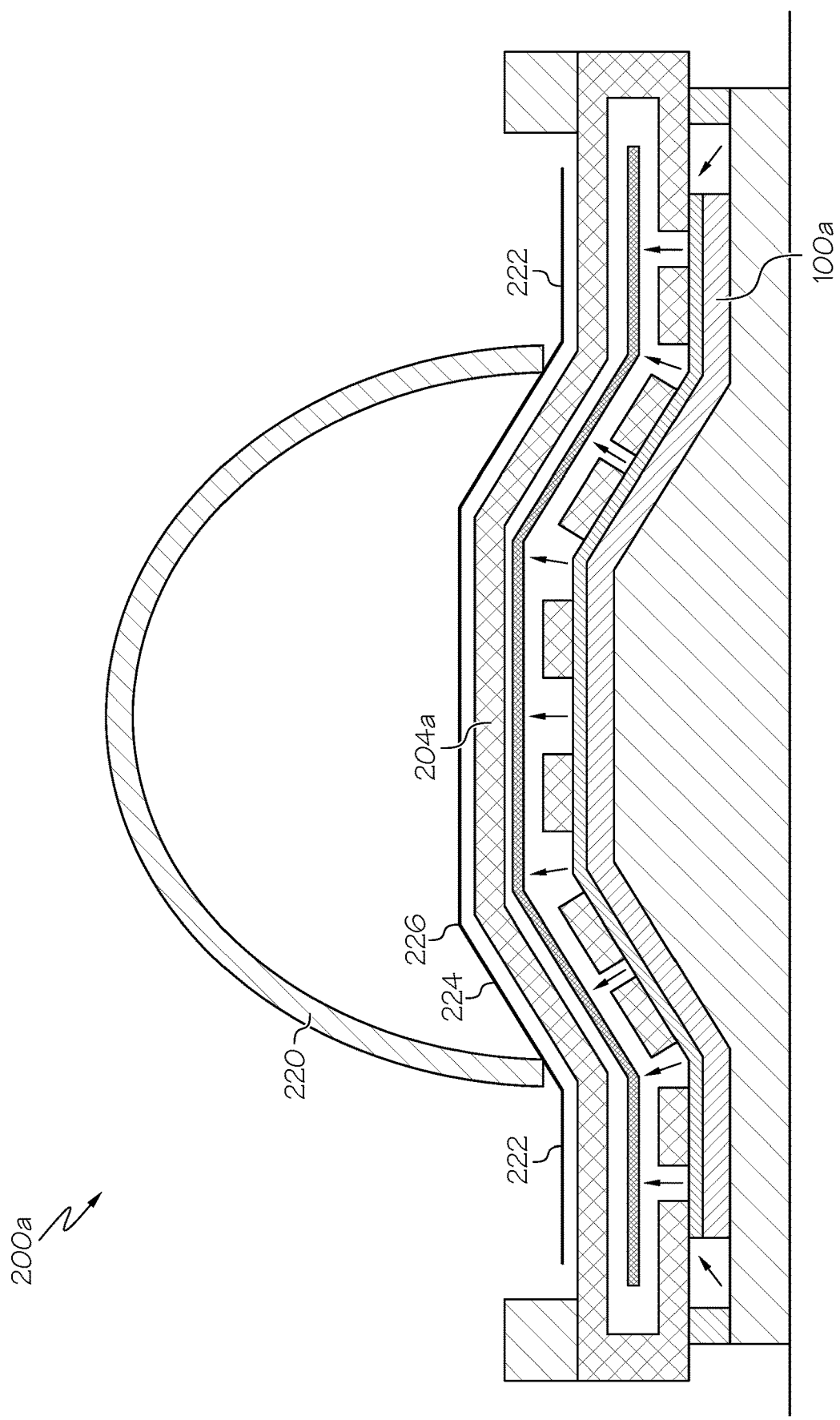
FIG. 8 is an elevational view, in section, similar to FIG. 6, and showing an optional finger-forming unit which can be used with the ply transporting and compacting apparatus.

Referring to FIG. 8, a cross-sectional view similar to FIG. 6 is illustrated. In particular, FIG. 8 shows an optional finger-forming unit 220 that can be used with the apparatus 200 of FIG. 6 to provide mechanical forming of a composite ply. To avoid confusion, the embodiment in FIG. 8 is described using like numerals in FIG. 6 with the suffix "a" added. The optional finger-forming unit 220 may comprise any suitable commercially-available finger-forming unit to apply mechanical forming of the composite ply 100a, such as in or around contours 224 and inflection points 226. Structure and operation of finger-forming units are known and conventional and, therefore, will not be described.

The optional finger-forming unit 220 is CNC-controlled. As such, no sensors are required. The optional finger-forming unit 220 is lowered onto the apparatus 200a using pneumatic cylinders (not shown) to facilitate shaping of the composite ply 100a. A slip plane 222 is disposed between the optional finger-forming unit 220 and the top-layer sheet 204a. The slip plane 222 material allows the optional finger-forming unit 220 to slip into a position relative to the forming tool 214 to apply mechanical pressure, thereby removing bridging across an inflection point 226. The optional finger-forming unit 220 can be sized and shaped to conform to the forming tool 214 in a way that avoids bridging across an inflection point. The slip plane 222 may comprise a stretchable material such as Teflon™ (trademark of The Chemours Company) coated fiberglass, for example, commercially available from Armalon Limited located in the United Kingdom.

Figure 9:
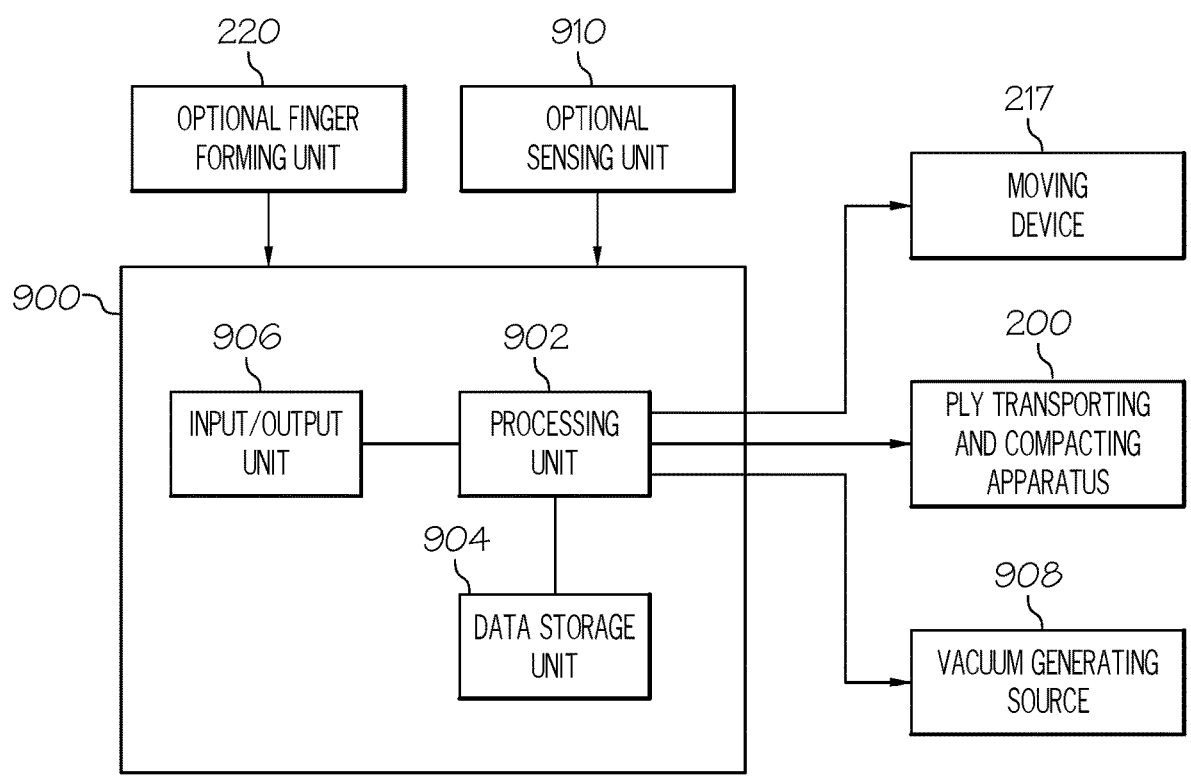
FIG. 9 is an example computer system associated with the ply transporting and compacting apparatus of FIG. 1 and capable of controlling devices to form a composite structure.

Referring to FIG. 9, illustrated is an example computer system 900 associated with the ply transporting and compacting apparatus 200 of FIG. 2 and capable of controlling devices to form a consolidated composite ply 101 (FIG. 7) or a layup of consolidated composite plies. Computer system 900 includes processing unit 902 that executes instructions stored in internal data storage unit 904, external data storage unit (not shown), or a combination thereof. Processing unit 902 may comprise any type of technology. For example, processing unit 902 may comprise a general-purpose electronic processor. Other types of processors and processing unit technologies are possible. Internal data storage unit 904 may comprise any type of technology. For examples, internal data storage unit 904 may comprise random access memory (RAM), read only memory (ROM), solid state memory, or any combination thereof. Other types of memories and data storage unit technologies are possible.

Computer system 900 further includes a number of input/output (I/O) devices 906 that may comprise any type of technology. For example, I/O devices 906 may comprise a keypad, a keyboard, a touch-sensitive display screen, a liquid crystal display (LCD) screen, a microphone, a speaker, or any combination thereof. Other types of I/O devices and technologies are possible. An optional sensing unit 910 provides input signals to the computer system 900. The optional finger-forming unit 220 described herein may also provide input signals to the computer system 900.

The processing unit 902 controls the ply transporting and compacting apparatus 200 to pick up cut pieces of composite ply. The processing unit 902 also controls a vacuum generating source 908 to draw a vacuum via vacuum line 212 in the first plenum area 209 (i.e., to the flow media 207 of the middle-layer sheet 206) so that the shaped composite ply 100 on the forming tool 214 can cure in the vacuum-tight environment as described herein. The processing unit 902 also controls the optional finger-forming unit 220 and the moving device 217.

The computer system 900 may comprise a computer numerically-controlled (CNC) based system. The CNC based system relies on location coordinates (e.g., (x, y, z) coordinates) that are part of the parameters of a pre-created CNC program that is stored in the data storage unit 904 of the computer system 900. The stored location coordinates enable control of the ply transporting and compacted apparatus 200 and the finger-forming unit 220.

The location coordinates of a composite ply 100 (FIG. 1) on the bed/table 102 (FIG. 1) at the cutting location are stored in the pre-created NC program. The stored location coordinates of a composite ply tell the apparatus 200 the location where it needs to move to pick up the composite ply 100. The stored coordinates of the composite ply 100 also tell the apparatus 200 the location where it needs to move to transport the composite ply 100 over to the forming tool 214 on the bed/table 215 at the forming location. This process is repeated for all composite plies (i.e., one or more composite plies) that are used to form the resulting composite structure.

The location coordinates of the optional finger-forming unit 220 of FIG. 8 are also stored in the pre-created NC program, as well as size and dimensions of finger-forming unit 220 and the configuration of the forming tool 214 where interface is desired on top of apparatus 200. This information tells pneumatic cylinders (not shown) or any other types of movement system the location where it needs to move to align so that the finger-forming unit 220 can be lowered at the appropriate location to facilitate forming a composite structure. It is conceivable that no sensor is needed to enable the computer system 900 shown in FIG. 9 to control operation of the ply transporting and compacting apparatus 200 to form a composite structure.

Although the above description describes the computer system 900 as requiring no sensor to control operation of the ply transporting and compacting apparatus 200, it is conceivable that an optional sensing unit 910 be provided to determine location and/or to validate location of a composite ply against the location indicated by the location coordinates stored in the NC program. Any detected differences in the location of a composite ply can be adjusted accordingly (via feedback control performed by the processing unit 902) to accurately align the apparatus 200 with the composite ply. The optional sensing unit 910 may comprise an overhead camera/optical recognition system, for example. Use of radar, lidar, video sensing, or the like for sensing location is also contemplated.

Figure 10:
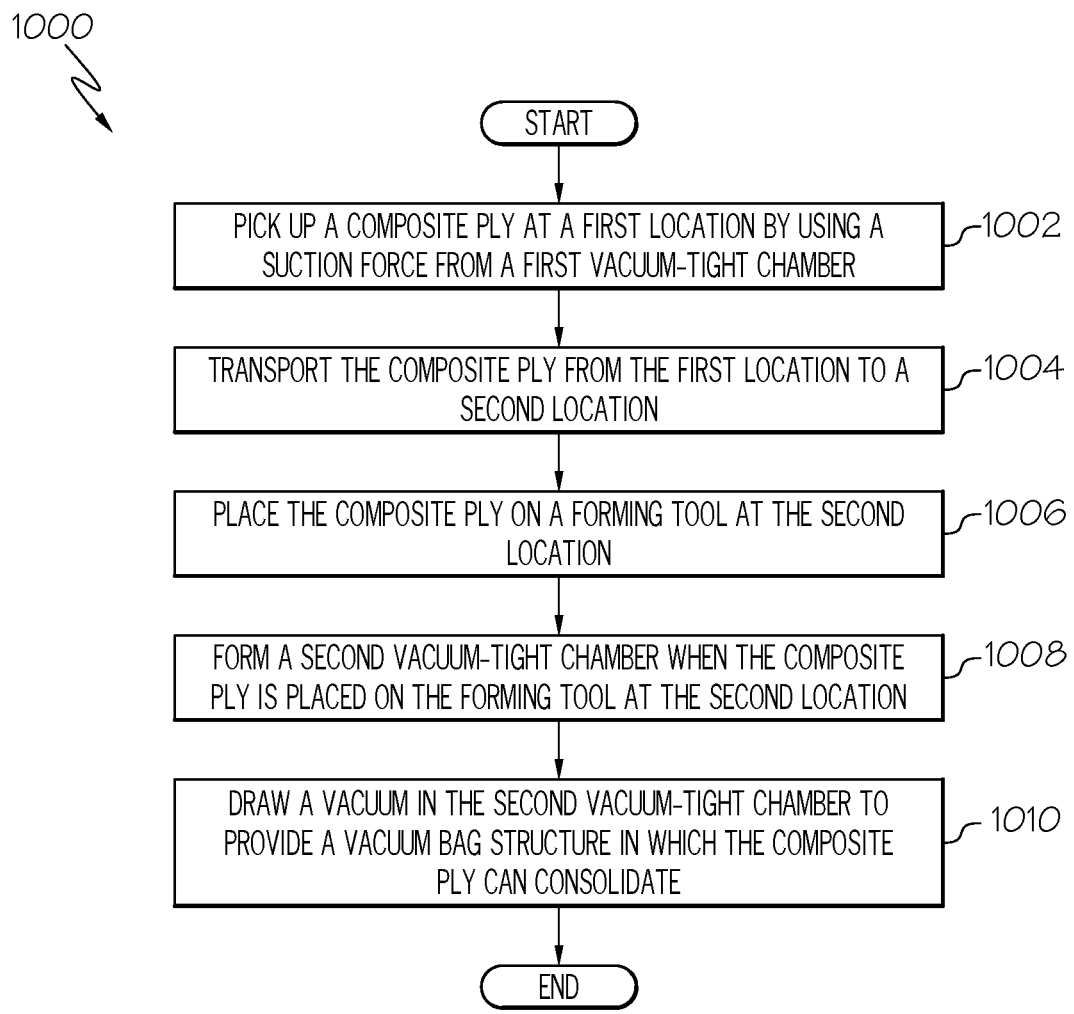
FIG. 10 is a flow diagram depicting an example method for forming a composite structure in accordance with an embodiment.

Referring to FIG. 10, a flow diagram 1000 depicts an example method for operating the example computer system of FIG. 9 to control operation of the apparatus 200 to form a composite structure in accordance with an embodiment. In block 1002, a composite ply is picked up at a first location by using a suction force from a first vacuum-tight chamber. The process then proceeds to block 1004 in which the composite ply is transported from the first location to a second location. Then, in block 1006, the composite ply placed on a forming tool at the second location. A second vacuum-tight chamber is formed when the composite ply is placed on the forming tool at the second location, as shown in block 1008. In block 1010, a vacuum is drawn in the second vacuum-tight chamber to provide a vacuum bag structure in which the composite ply can consolidate. The process then ends.

In some embodiments, the composite ply is placed on any previously draped plies so that the composite ply is draped-formed to contours of the previously draped plies or to contours of the forming tool.

In some embodiments, a vacuum is drawn in the second vacuum-tight chamber to provide a vacuum bag structure in which a composite preform is formed from a plurality of composite plies.

In some embodiments, the method further comprises allowing the composite preform to be compacted by the vacuum in the vacuum bag structure and thereby to form the composite structure with the desired shape.

In some embodiments, the vacuum that is in the vacuum bag structure is released, and the formed composite structure with the desired shape is removed.

In some embodiments, the composite ply is trimmed prior to picking up the composite ply.

It should be apparent that the above-described apparatus 200 is robotically controlled. The need for operating personnel to pick up and transport cut composite plies to a forming tool is eliminated. As such, an automated process is provided to form a composite structure. Accordingly, the automated process reduces potential damage to the formed composite structure.

It should also be apparent that the top and bottom layer sheets 204, 208 define the first plenum area 209 through which a vacuum from the vacuum generating source 908 can be drawn. The computer system 900 including the processing unit 902 controls devices including the vacuum generating source 908 to control (i) picking of the composite ply 100 based upon sensed ply position information, (ii) placing of the composite ply 100 based upon sensed ply position information, and (iii) vacuum bagging of the composite ply 100 based upon sensed vacuum pressure information in the second plenum area 211 that includes the first plenum area 209.

It should further be apparent that above-described ply transporting and compacting apparatus 200 functions as both a composite ply carrier and a vacuum bag. The apparatus 200 is used as a vacuum "chuck" to hold a composite ply so that the composite ply can be transported from a cutting location (or a trimming location) to a forming location with accurate indexing. The apparatus 200 is also used as a vacuum bag to allow the composite ply to be more compacted by the vacuum in the vacuum bag to form a consolidated composite ply with accurate indexing. A single device is used to both carry composite plies and vacuum consolidate composite plies. This not only reduces factory floor space needed to form a composite structure, but also reduces the time needed to form a composite structure since the time between cutting a composite ply and placing the cut composite ply on a forming tool is reduced. Thus, total production costs are reduced.

It should also be apparent that a composite ply is placed onto a forming tool at the forming location with accurate indexing. This provides a more accurate and repeatable indexing of the composite ply to the desired forming position on the forming tool. Moreover, when a vacuum bag structure described herein is used, there is no need for a step of retracting a device followed by a step of applying a separate vacuum bag. This is because the vacuum bag structure described herein is effectively a vacuum bag, and is formed when a composite ply is placed onto the forming tool. Thus, the vacuum bag structure not only eliminates the need for a trimmer after the composite structure has been formed, but also eliminates the need for a separate vacuum bag during compacting of the layup of one or more composite plies to form the composite structure.

Figure 11:
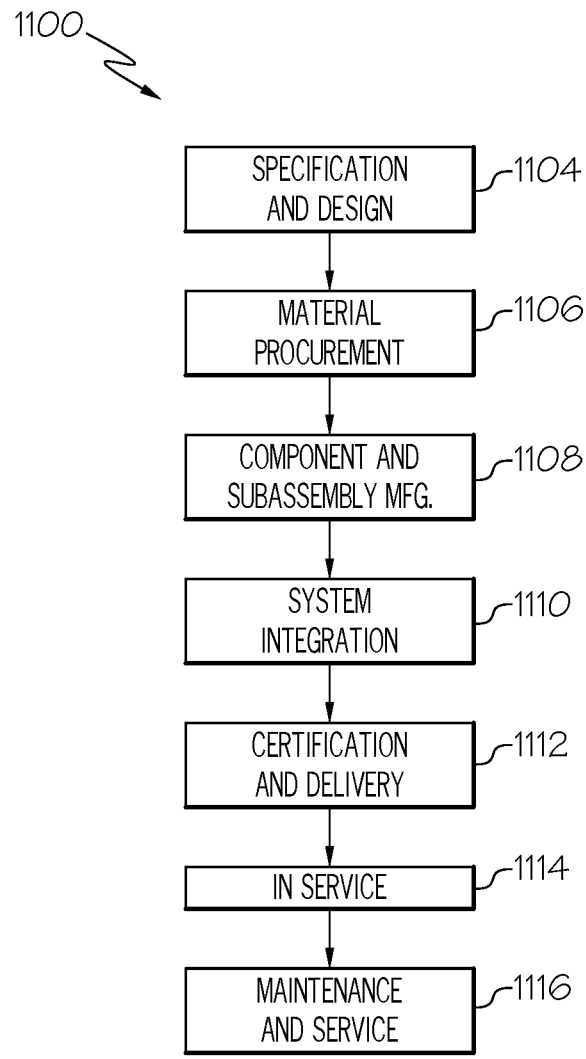
FIG. 11 is a flow diagram of an aircraft manufacturing and service methodology.
Figure 12:
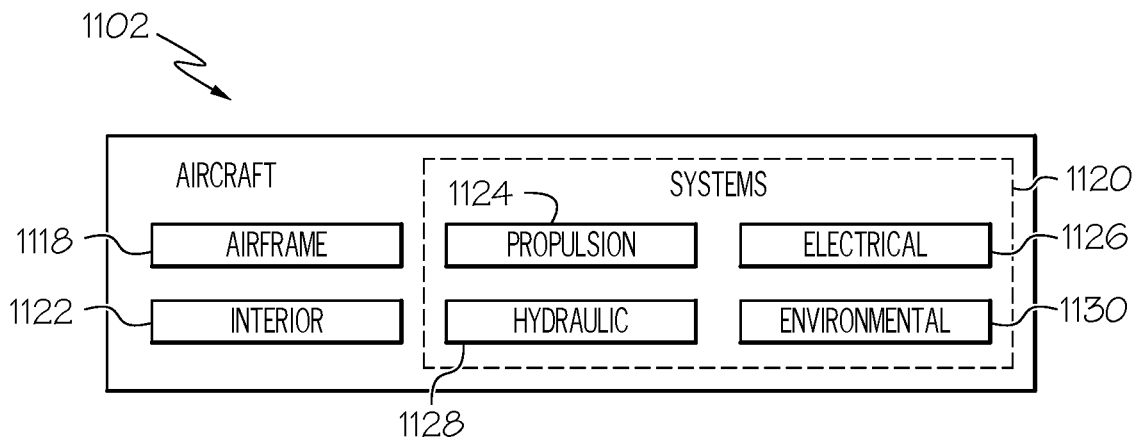
FIG. 12 is a block diagram of an aircraft.

Examples of the disclosure may be described in the context of an aircraft manufacturing and service method 1100, as shown in FIG. 11, and an aircraft 1102, as shown in FIG. 12. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed apparatus and method may be employed during any one or more of the stages of the aircraft manufacturing and service method 1100. As one example, a portion (or portions) of the aircraft 1102 may be assembled using the disclosed apparatus and method. As another example, components or subassemblies corresponding to component/subassembly manufacturing 1108, system integration 1110, and/or maintenance and service 1116 may be assembled using the disclosed apparatus and method. As another example, the airframe 1118 may be constructed using the disclosed apparatus and method. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed embodiments may be implemented in software, hardware, firmware, or a combination thereof. The various elements of the system, either individually or in combination, may be implemented as a computer program product (program of instructions) tangibly embodied in a machine-readable storage device (storage medium) for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Also, although the above-description describes an apparatus and method for forming a composite structure for an airplane part in the aviation industry in accordance with military and space regulations, it is contemplated that the apparatus and method may be implemented to facilitate forming a composite structure in any industry in accordance with the applicable industry standards. The specific apparatus and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A ply transporting and compacting apparatus comprising:
   a rigid frame;
   a moving device coupled to the frame;
   a top-layer sheet of flexible rubber material fastened to the frame;
   a bottom-layer sheet of perforated flexible rubber material having openings; and
   a middle-layer sheet of flow media material disposed in a first plenum area that is defined between the top and bottom layer sheets.

2. The ply transporting and compacting apparatus of claim 1 wherein the moving device is configured to lower the frame and sheets onto a composite ply at a trimming location and to pick up the composite ply with a suction force when a vacuum is drawn in the first plenum area to create the suction force through the openings of the bottom-layer sheet.

3. The ply transporting and compacting apparatus of claim 2 wherein the moving device is arranged to transport the composite ply that has been picked up from the trimming location to a forming location.

4. The ply transporting and compacting apparatus of claim 3 wherein the moving device is arranged to drape the composite ply onto a forming tool at the forming location or any previously draped plies on the forming tool to create a second plenum area that is larger than the first plenum area.

5. The ply transporting and compacting apparatus of claim 4 wherein the second plenum area includes the first plenum area and is defined in part between an edge of the composite ply and a lip seal on the forming tool.

6. The ply transporting and compacting apparatus of claim 5 further comprising:
   a portable vacuum generating source which can draw a vacuum in the second plenum area to provide a vacuum bag structure in which the composite ply can consolidate.

7. The ply transporting and compacting apparatus of claim 1 wherein the flow media comprises at least one of bi-planer mesh and non-woven fabric.

8. A system for enabling a composite ply to be picked at a trimming location, placed at a forming location, and then vacuum bagged at the forming location, the system comprising:
   a frame;
   a first plenum area within the frame; and
   a controller arranged to control (i) picking of the composite ply based upon sensed ply position information, (ii) placing of the composite ply based upon sensed ply position information, and (iii) vacuum bagging of the composite ply based upon sensed vacuum pressure information in a second plenum area.

9. The system of claim 8 wherein the first plenum area is defined between a top-layer sheet that is flexible and supported by the frame and a bottom-layer sheet that is flexible, perforated and supported by the frame.

10. The system of claim 9 wherein the frame is rigid, the top-layer sheet comprises flexible rubber material, and the bottom-layer sheet comprises flexible rubber material.

11. The system of claim 10 further comprising:
    a vacuum generating source coupled to the first plenum area that is defined between the top-layer sheet and the bottom-layer sheet.

12. The system of claim 8 further comprising:
    a forming tool on which the composite ply is placed at the forming location.

13. The system of claim 8 wherein the second plenum area is larger than the first plenum area.

14. The ply transporting and compacting apparatus of claim 1 wherein the top-layer sheet of flexible rubber material comprises a solid flexible rubber.

15. The ply transporting and compacting apparatus of claim 1 wherein the top-layer sheet of flexible rubber material comprises silicone rubber.

16. The ply transporting and compacting apparatus of claim 1 wherein the bottom-layer sheet of perforated flexible rubber material comprises silicone rubber.

17. The ply transporting and compacting apparatus of claim 1 further comprising a vacuum line fluidly coupled with the first plenum area.

18. The system of claim 8 wherein the first plenum area is defined by a top-layer sheet supported by the frame and a bottom-layer sheet supported by the frame, the top-layer sheet comprising flexible rubber material and the bottom-layer sheet comprising perforated flexible rubber material.

19. The system of claim 18 further comprising flow media material disposed in a first plenum area that is defined between the top-layer sheet and the bottom-layer sheet.

20. The system of claim 19 wherein the flow media material comprises at least one of bi-planer mesh and non-woven fabric.

* * * * *